ABSTRACT

United States Patent

[11] 3,584,946

| [72] | Inventor | Helmut Rube |
| | | Endersbach, Germany |
| [21] | Appl. No. | 745,801 |
| [22] | Filed | July 18, 1968 |
| [45] | Patented | June 15, 1971 |
| [73] | Assignee | Robert Bosch Photokino GmbH |
| | | Stuttgart-Unterturkheim, Germany |
| [32] | Priority | Aug. 3, 1967 |
| [33] | | Germany |
| [31] | | P 15 72 581.2 |

[54] SLIDE PROJECTOR AND SLIDE TRAY THEREFOR
9 Claims, 4 Drawing Figs.

[52] U.S. Cl. ................................................ 353/117
[51] Int. Cl. .......................................... G03b 23/06
[50] Field of Search ........................................ 353/116,
117, 103, 114, 107, 104, 118

[56] References Cited
UNITED STATES PATENTS
| 3,343,454 | 9/1967 | Mahoney | 353/117 |
| 3,409,353 | 11/1968 | Zillmer | 353/117 |

*Primary Examiner*—Leonard Forman
*Assistant Examiner*—A. J. Mirabito
*Attorney*—Michael S. Striker ABSTRACT: The housing of a slide projector is provided with a pocket for reception of a circular slide tray which is indexible about a vertical axis. The pocket accommodates an upwardly extending positioning projection which can enter a central opening in the bottom panel of the tray only when the tray is introduced into the pocket in a predetermined angular position. The pocket also accommodates a straight rib which extends downwardly from a top wall of the housing and can enter a radial slot of the tray when the latter is held in predetermined angular position and is moved into the pocket with its bottom panel located in a plane above the tip of the projection.

INVENTOR
HELMUT RUBE

INVENTOR
HELMUT RUBE
BY
Michael S. Stoker
his ATTORNEY

SLIDE PROJECTOR AND SLIDE TRAY THEREFOR

BACKGROUND OF THE INVENTION

The present invention relates to slide projectors in general, and more particularly to improvements in slide projectors which can be utilized with circular slide trays.

In projectors of the just outlined character, the user must take care to insure that the tray is attached to or mounted on or in the projector housing in a predetermined angular position. This is necessary in order to insure that the first slide of a series of slides in the compartments of the tray is ready to be moved to viewing position as soon as the tray is properly mounted on or in the housing of the projector. In many instances, the compartments of a circular tray are numbered and the numerals are caused to move past a fixed index mark on the housing of the projector so that the user knows the number of that slide which is in registry with the slide changer. Such numbering of compartments is advisable and practical when the tray is mounted on top of the projector housing so that the user can readily observe the index mark and the numerals on the tray. Furthermore, the index mark and the numbering can be observed only when the area in which the projector is used is lighted. In other words, if the user wishes to learn the number of that slide which is ready to be viewed, the lights in the projection room must be turned on again and again which is annoying and time-consuming. For example, the lights must be turned on after completed viewing of slides in a tray because the operator of the projector must be able to mount the next tray in requisite angular position to make sure that the foremost slide of the next series is to be viewed first.

U.S. Pat. No. 3,276,156 to Robinson discloses a slide tray which can be mounted on the projector housing in any desired angular position and is thereupon rotated until a projection of the housing enters an opening in the bottom portion of the tray. Thus, it is necessary to properly center the tray on the projector housing in a first step, and the magazine must be rotated in the next-following step to insure proper orientation for presentation of slides in a desired sequence. An inexperienced or absentminded operator is likely to forget the second step so that the tray is not indexed in response to depression of the corresponding knob. This can result in damage to the projector and/or tray and in lengthy interruptions, particularly if the operator is not sufficiently familiar with the manipulation of the projector so that he fails to detect the cause.

SUMMARY OF THE INVENTION

It is an object of the present invention to provide an arrangement which includes a slide projector and a circular slide tray and wherein the tray and the housing of the projector are constructed in such a way that the user cannot mount the tray in or on the housing unless the tray is held in a position in which the foremost slide of a series in the compartments of the tray is ready to be moved to viewing position upon proper mounting of the tray.

Another object of the invention is to provide a projector housing and a circular slide tray with cooperating guide means which insure proper positioning of the foremost slide when the tray is mounted in or on the housing so that it is ready to be rotated stepwise by the indexing mechanism of the projector.

A further object of the invention is to provide a slide projector wherein the tray must be mounted on a shaft or a like positioning device in order to be indexible by the indexing mechanism of the projector and wherein the tray and the projector housing are designed in such a way that the mounting of the tray on the positioning device is possible only when the tray is held in a predetermined angular position with reference to the housing.

The improved arrangement comprises a slide projector including a housing having a stub, a shaft or analogous positioning means; a circular slide tray adapted to be mounted on the positioning means, preferably in such a way that it is then indexible about a vertical axis, and cooperating guide means provided on the tray and on the housing to permit mounting of the tray on the positioning means only in a predetermined angular position of the tray, namely, in such angular position that the user knows in advance the sequence in which the images of slides in the compartments of the tray will be projected in response to successive operations of the indexing means for the tray.

The bottom panel of the tray is preferably provided with a central opening and the positioning means preferably comprises a projection which enters the opening in response to proper mounting of the tray. The guide means may comprise cooperating male and female coupling portions one of which is provided on the tray and the other of which is provided on the housing. For example, the male portion of the guide means may comprise a straight rib which is rigid with and extends downwardly from a top wall of the housing at a level above the projection, and the female coupling portion may comprise a slotted part of the tray which can receive the rib and permits movement of the opening in the bottom panel of the tray into registry with the projection of the housing only when the tray is held in a predetermined angular position. The distance between a first plane including the lowermost portion of the rib and a second plane including the tip of the projection is less than the height of the tray and the latter is preferably held in a horizontal plane during movement to place its opening into registry with the projection.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
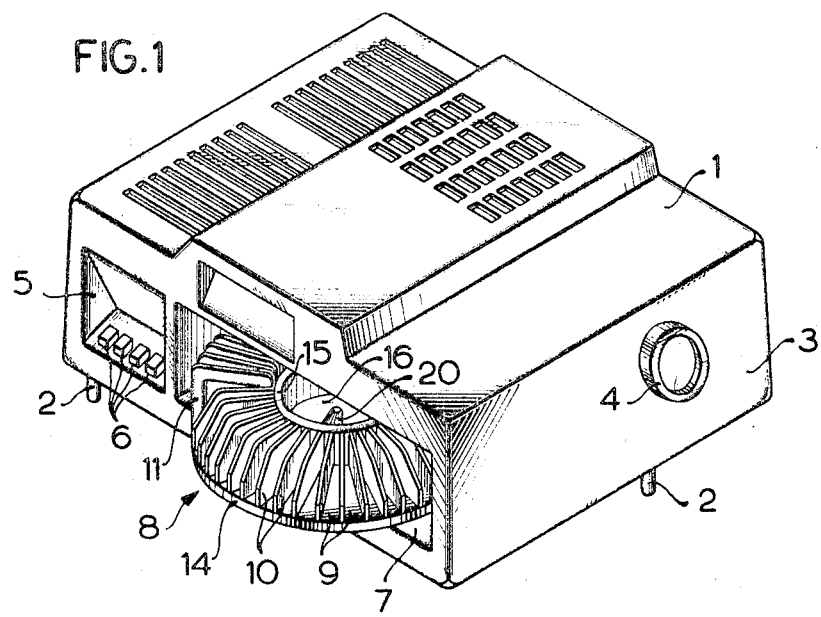
FIG. 1 is a perspective view of a slide projector and a circular slide tray which embody the invention.
Figure 2:
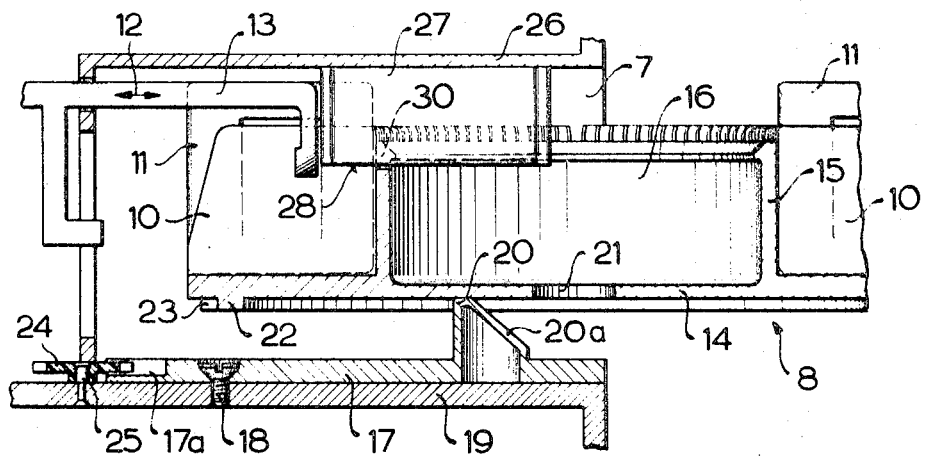
FIG. 2 is an enlarged fragmentary transverse vertical sectional view of the projector, the tray being shown in partly inserted position.

The arrangement which is shown in FIG. 1 comprises a slide projector and a circular slide tray 8. The projector has a housing or body 1 provided with several feet 2 and including a front wall 3 which carries a lens barrel 4. The right-hand sidewall of the housing is provided with a recess 5 for a row of pushbuttons 6 which effect starting and stoppage of the motor (not shown), completing and opening of the lamp circuit, and starting and stoppage of the slide changing and tray indexing mechanisms. The right-hand sidewall of the housing 1 is further provided with a deeper recess or pocket 7 which accommodates the aforementioned slide tray 8 in such position that the tray is indexible about a vertical axis and that the majority of its radial compartments 9 are accommodated in the interior of the housing. The compartments 9 are separated from each other by radially extending partitions 10 and accommodate slides 11. FIG. 2 illustrates a slide changer 13 which is reciprocable in directions indicated by double-headed arrow 12 and serves to transport slides 11 between the compartments 9 and a viewing position in which the slides extend across the optical axis of the lens barrel 4. The manner in which the slide changer 13 is operated is well known and is not illustrated in detail. The tray 8 has a bottom panel 14 and a cylindrical shell 15 which surrounds a round chamber 16. The compartments 9 extend radially outwardly from the shell 15.

The bottom wall 17 of the pocket 7 constitutes an integral or separable component of the housing 1. In the illustrated embodiment, the bottom wall 17 is affixed to the base plate 19 of the housing 1 by screws 18 or analogous fasteners. The bottom wall 17 is provided with an upwardly extending positioning projection or stud 20 which is accommodated in a central opening 21 of the bottom panel 14 when the tray 8 is properly accommodated in the pocket 7. The stud 20 is configured in such a way that its cross section area decreases in a direction away from the bottom wall 17. In the illustrated embodiment, the stud 20 is basically a hollow cylinder but is provided with a slanting facet 20a which faces the open side of the pocket 7, see FIG. 2 or 3. In this way, the bottom panel 14 of the tray 8 can be readily slid over the facet 20a during insertion of the tray.

The underside of the bottom panel 14 is formed with a concentric rim 22 which carries an annulus of external teeth 23 forming a large gear which can mesh with a driver gear or pinion 24 forming part of the aforementioned indexing mechanism for the tray. The pinion 24 is rotated stepwise so as to place successive compartments 9 into registry with the slide changer 13 and is mounted on a shaft 25 which is secured to and extends upwardly from the base plate 19 of the housing 1. When the tray 8 is properly inserted in the housing 1, its rim 22 is accommodated in an arcuate groove 17a provided in the bottom wall 17 (see particularly FIG. 3).

Figure 4:
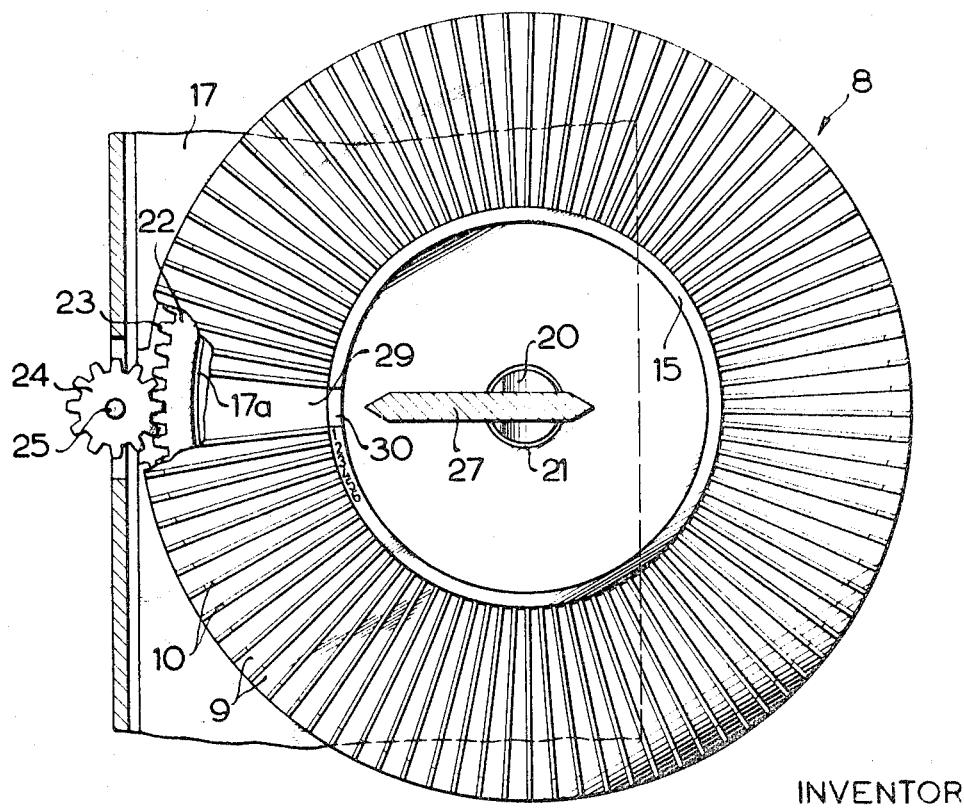
FIG. 4 is a horizontal sectional view as seen in the direction of arrows from the line IV-IV of FIG. 3.

The housing 1 further comprises a horizontal top wall 26 which extends above the pocket 7 and is provided with an elongated male guide member 27 or rib which registers with the slide changer 13. The rib 27 extends downwardly from the top wall 26 and the distance between the plane of its bottom edge face 28 and the plane of the tip of the stud 20 is somewhat less than the height of the tray 8. As shown in FIG. 4, one or more partitions 10 are omitted so that the relatively wide compartment between the adjoining partitions 10 forms a radially extending slot 29 which communicates with the chamber 16 by way of a second slot 30 in the cylindrical shell 15. The compartment numbered "1" is immediately adjacent to the slot 29, as considered in the counterclockwise direction. The purpose of the slots 29 and 30 is to permit entry of the rib 27 into the chamber 16 during insertion of the tray 8 into the pocket 7 but only when the tray is held in a predetermined angular position. Such predetermined angular position of the tray is shown in FIG. 4, i.e., the rib 27 and the slots 29, 30 are located in a common vertical plane. This insures that the very first indexing of the tray 8 by way of the pinion 24 places the first slide 11 (in the compartment No. 1) into registry with the slide changer 13.

Figure 3:
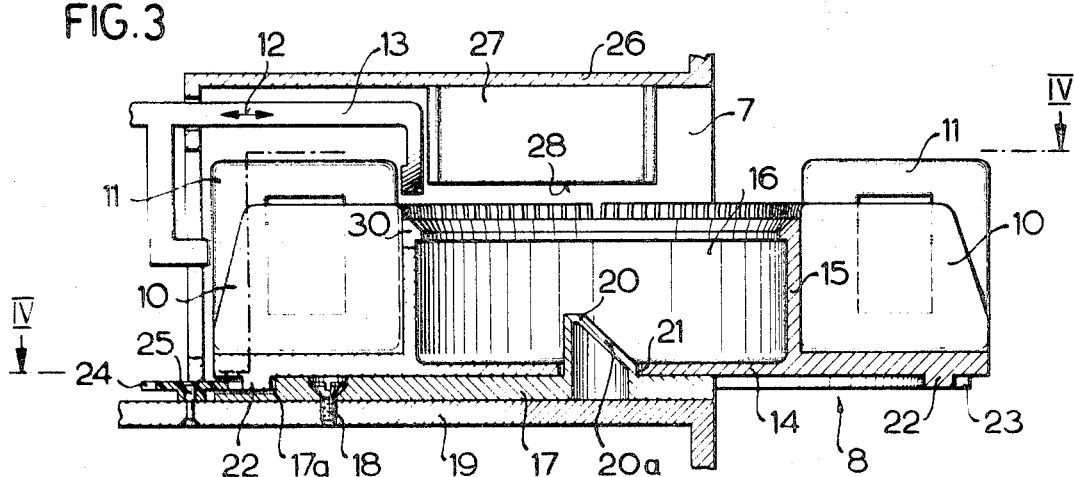
FIG. 3 illustrates the structure of FIG. 2, with the tray in fully inserted position.

The insertion or removal of the tray 8 is carried out in the following way: The user selects a particular tray 8 which contains a desired set of slides 11 and the tray is introduced into the pocket 7 in horizontal or nearly horizontal position. Even before the operator begins to insert the tray, the latter is moved to such angular position that the slot 29 is aligned with the rib 27. The tray is thereupon lifted subsequent to partial insertion into the pocket 7 so that its bottom panel 14 is located slightly above the tip of the stud 20. The user is then free to insert the tray all the way whereby the rib 27 travels through the slots 29, 30 and enters the chamber 16. Once the rib 27 extends into the slot 29 or 30, the user is compelled to maintain the tray 8 in requisite angular position because the rib then prevents rotation until after it enters the chamber 16. When the rim 22 has cleared the tip of the stud 20, the operator can deposit the bottom wall 14 onto the tip of the stud (see FIG. 2) and can simply push the tray inwardly until the stud enters the opening 21 (FIG. 3). The tray descends by gravity as soon as the stud 20 enters the opening 21. Thus, the tray then rests on the bottom plate 17 and the teeth 23 of its rim 22 mesh with the teeth of the pinion 24.

The user then depresses that pushbutton 6 which causes the motor to turn the pinion 24 in a counterclockwise direction so that the tray 8 is indexed in a clockwise direction, as viewed in FIG. 4, and the compartment No. 1 with a first slide 11 therein moves into registry with the slide changer 13. The latter automatically engages and transports the first slide 11 to viewing position. When the aforesaid pushbutton 6 is depressed again, the slide changer 13 returns the slide 11 from viewing position into the corresponding compartment No. 1 and the pinion 24 indexes the tray 8 to place the compartment No. 2 into registry with the slide changer 13. The same procedure is repeated until the tray 8 completes a full revolution. In other words, the tray 8 then returns to the position of FIG. 4 and is ready to be removed from the pocket 7. This is achieved by lifting the tray above and away from the bottom wall 17 until the bottom panel 14 reaches a level above the stud 20. The rib 27 registers with the slots 29, 30 and permits sidewise withdrawal of the tray.

If the user attempts to insert a tray 8 which is not held in proper angular position, the partitions 10 or the slides 11 in the compartments 9 abut against the rib 27 and prevent insertion of the tray. In other words, once the tray 8 is properly accommodated in the pocket 7, the user knows that the first slide 11 will register with the slide changer 13 in response to first indexing of the tray.

That part of the tray 8 which defines the composite slot including the slots 29, 30 constitutes a female coupling portion which cooperates with the male coupling portion 27 to prevent mounting of the tray on the stud 20 unless the tray is held in predetermined angular position.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What I claim as new and desired to be protected by Letters Patent is set forth in the appended

1. An arrangement of the character described, comprising a slide projector including a housing having a positioning projection; a circular slide tray including a panel having a centrally located opening adapted to receive said projection; and first and second guide means cooperating to guide the tray during movement toward registry of said opening with said projection and to permit mounting of the tray on said projection in a predetermined angular position of the tray, said first guide means comprising a guide member provided on and being observable from without said housing and said second guide means having a substantially radially extending guide slot provided in said tray and receiving said guide member when the tray is held in said predetermined angular position and is moved in a direction which is at least substantially normal to its axis to place said opening into registry with said projection.

2. An arrangement as defined in claim 1, wherein the tray is indexible about a substantially vertical axis upon proper mounting on said positioning means.

3. An arrangement as defined in claim 2, wherein said panel is the bottom panel of said tray and said guide member is located at a level above said projection, said tray being confined in a substantially horizontal plane during movement in said direction to place said opening into registry with said projection.

4. An arrangement as defined in claim 3, wherein the height of said tray exceeds the shortest distance between a first plane including the lowermost portion of said guide member and a second plane including the tip of said projection.

5. An arrangement as defined in claim 4, wherein said guide member is a straight rib and said housing comprises a top wall which is rigid with said rib and from which said rib extends downwardly.

6. An arrangement as defined in claim 1, wherein said tray is provided with a centrally located chamber which accommodates said guide member when the tray is properly mounted on said positioning means.

7. An arrangement as defined in claim 1, wherein said housing comprises a sidewall having a pocket therein and wherein said projection and said guide member are located in said pocket.

8. An arrangement as defined in claim 1, wherein said tray is provided with an annulus of radially extending compartments for slides and wherein said slot is disposed between a pair of said compartments.

9. An arrangement as defined in claim 8, wherein one of the compartments which flank said slot is the foremost compartment of said annulus and normally accommodates the foremost slide of a series.